US010451115B2

(12) United States Patent
Ohara et al.

(10) Patent No.: US 10,451,115 B2
(45) Date of Patent: Oct. 22, 2019

(54) MAGNETIC FLUID SEALING DEVICE AND MAGNETIC FLUID SEALED BEARING

(71) Applicant: GLOBERIDE, Inc., Tokyo (JP)

(72) Inventors: Takeshige Ohara, Tokyo (JP); Yutaro Abe, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 16/130,668

(22) Filed: Sep. 13, 2018

(65) Prior Publication Data

US 2019/0101159 A1 Apr. 4, 2019

(30) Foreign Application Priority Data

Sep. 29, 2017 (JP) ................................. 2017-189956

(51) Int. Cl.
| | |
|---|---|
| *F16C 33/76* | (2006.01) |
| *A01K 89/015* | (2006.01) |
| *F16C 33/78* | (2006.01) |
| *F16J 15/43* | (2006.01) |
| *F16C 19/06* | (2006.01) |

(52) U.S. Cl.
CPC ........ *F16C 33/765* (2013.01); *A01K 89/0193* (2015.05); *F16C 33/7816* (2013.01); *F16C 33/7846* (2013.01); *F16C 33/7886* (2013.01); *F16J 15/43* (2013.01); *F16C 19/06* (2013.01); *F16C 2210/06* (2013.01); *F16C 2223/32* (2013.01); *F16C 2310/00* (2013.01); *F16C 2316/30* (2013.01)

(58) Field of Classification Search
CPC ...... F16C 33/765; F16C 33/7816; F16J 15/43
See application file for complete search history.

(56) References Cited

U.S. PATENT DOCUMENTS

| 5,057,952 A | 10/1991 | Takahashi |
| 5,152,539 A | 10/1992 | Takii et al. |
| 5,238,254 A * | 8/1993 | Takii ..................... F16C 33/765 |
| | | 277/347 |

(Continued)

FOREIGN PATENT DOCUMENTS

| DE | 3719116 A1 | 12/1987 |
| EP | 0597421 A2 | 5/1994 |

(Continued)

OTHER PUBLICATIONS

Extended European Search Report dated Feb. 27, 2019 issued in corresponding EP Application No. 18193511.5.

*Primary Examiner* — Phillip A Johnson
(74) *Attorney, Agent, or Firm* — DLA Piper LLP (US)

(57) ABSTRACT

One object is to provide a magnetic fluid sealing device in which a magnetic fluid retained between a polar plate and a drive portion can be effectively prevented from spilling, so as to retain waterproofness for a long period. A magnetic fluid sealing device of the present invention includes a ring-shaped polar plate encircling a drive portion and retaining a magnet; and a magnetic fluid retained in a gap between the drive portion and the polar plate by a magnetic force of the magnet. The polar plate has a spill preventing portion provided thereon, the spill preventing portion having a projecting wall that is disposed distant from an end surface of the polar plate retaining the magnetic fluid, so as to prevent spill of the magnetic fluid.

4 Claims, 19 Drawing Sheets

(56) References Cited

U.S. PATENT DOCUMENTS

| | | | |
|---|---|---|---|
| 5,876,037 A | 3/1999 | Ishizaki et al. | |
| 6,290,233 B1 * | 9/2001 | Yamamura | F16J 15/43 |
| | | | 277/410 |
| 6,800,976 B2 * | 10/2004 | Oelsch | F16C 33/765 |
| | | | 277/410 |
| 2015/0063733 A1 | 3/2015 | Ohara | |

FOREIGN PATENT DOCUMENTS

| | | |
|---|---|---|
| JP | 56-76722 A | 6/1981 |
| JP | 59-035773 U1 | 3/1984 |
| JP | 2010-187556 A | 9/2010 |
| JP | 2013-228044 A | 11/2013 |
| SU | 1048217 A | 10/1983 |
| WO | 00/43698 A1 | 7/2000 |

* cited by examiner

MAGNETIC FLUID SEALING DEVICE AND MAGNETIC FLUID SEALED BEARING

CROSS-REFERENCE TO RELATED APPLICATIONS

This application is based on and claims the benefit of priority from Japanese Patent Application Serial No. 2017-189956 (filed on Sep. 29, 2017), the contents of which are hereby incorporated by reference in their entirety.

TECHNICAL FIELD

The present invention relates to a magnetic fluid sealing device and a magnetic fluid sealed bearing that are disposed in a drive force transmission mechanism built into a main body of an apparatus used in a harsh environment such as a fishing reel.

BACKGROUND

A fishing reel contains a drive force transmission mechanism that includes a rotational shaft, a drive gear, bearings rotatably supporting these elements, and a clutch, and a fishing reel is used in an environment where dust and moisture tend to penetrate internal parts. Therefore, it has been proposed to build in a magnetic fluid sealing device such as disclosed in Japanese Patent Application Publication No. 2010-187566 (hereinafter "the '566 Publication") to protect primary constituents. In the '566 Publication, the magnetic fluid sealing device is disposed in an opening portion of a housing cavity in a reel body in which a one-way clutch is provided. A magnetic fluid retained between the reel body and a drive portion (a pinion) prevents dust and moisture from penetrating the one-way clutch.

The rotational shaft in a fishing reel is typically supported with ball bearings in order to improve rotation performance of the rotational shaft. The ball bearings contain multiple rolling elements (rolling members) circumferentially arranged between inner and outer rings. Such bearings are susceptible to penetration of foreign substances such as dust and moisture through a gap between the inner and outer rings, and thus it has been proposed to seal the bearings with a magnetic fluid as disclosed in Japanese Patent Application Publication No. 2013-228044, for example.

In a fishing reel including the magnetic fluid sealing device and the magnetic fluid sealed bearings mentioned above, penetration of dust and moisture can be effectively prevented if it is used normally. However, when the fishing reel is dropped into water or when the fishing reel is washed with tap water or showered after use, water flowing on a polar plate penetrates the magnetic fluid portion and acts to remove the magnetic fluid. This action reduces the amount of the magnetic fluid, and as a result, the waterproofness cannot be retained for a long period.

SUMMARY

The present invention addresses the above problem, and one object thereof is to provide a magnetic fluid sealing device and a magnetic fluid sealed bearing in which, even upon penetration of moisture, a magnetic fluid retained between a polar plate and a drive portion can be effectively prevented from spilling, so as to retain waterproofness for a long period.

To achieve the above object, a magnetic fluid sealing device of the present invention comprises: a ring-shaped polar plate encircling a drive portion and retaining a magnet; and a magnetic fluid retained in a gap between the drive portion and the polar plate by a magnetic force of the magnet, wherein the polar plate has a non-magnetic spill preventing portion provided thereon, the spill preventing portion having a projecting wall that is disposed distant from an end surface of the polar plate retaining the magnetic fluid, so as to prevent spill of the magnetic fluid.

In the above arrangement, the spill preventing portion is provided on the polar plate included in the magnetic fluid sealing device, and the still preventing portion has the projecting wall that is distant from the end surface of the polar plate. With the magnetic fluid sealing device disposed on the drive portion of a fishing reel, even when the reel body is washed with water and moisture penetrates the exposed surface side of the polar plate to generate a strong water flow running toward the drive portion, the flowing rate of the water flowing on the surface of the polar plate and acting on the magnetic fluid is weakened, and therefore, a smaller portion of the magnetic fluid retained by the magnetic force is removed. As a result, the reduction of the amount of the magnetic fluid is inhibited, making it possible to maintain the waterproofness for a long period. The magnetic fluid sealing device including the spill preventing portion can be disposed on various portions of a drive force transmission mechanism of a fishing reel and can also be disposed in apparatuses other than fishing reels.

To achieve the above object, a magnetic fluid sealed bearing of the present invention comprises: an inner ring and an outer ring, both formed of a magnetic material; a plurality of rolling elements interposed between the inner ring and the outer ring; a ring-shaped polar plate disposed on an opening side between the inner ring and the outer ring, the polar plate having a magnet mounted thereto; and a magnetic fluid retained in a gap between the polar plate and the inner ring or in a gap between the polar plate and the outer ring, so as to seal the plurality of rolling elements, wherein the polar plate has a non-magnetic spill preventing portion provided thereon, the spill preventing portion having a projecting wall that is disposed distant from an end surface of the polar plate retaining the magnetic fluid, so as to prevent spill of the magnetic fluid.

The above-described non-magnetic spill preventing portion disposed on the polar plate of the bearing having the magnetic fluid seal can also weaken the flowing rate of the water flowing on the surface of the polar plate and acting on the magnetic fluid. Therefore, the reduction of the amount of the magnetic fluid is inhibited, making it possible to maintain the waterproofness for a long period.

The polar plate in the magnetic fluid sealing device and the magnetic fluid sealed bearing described above is made of a magnetic material such that the retained magnet forms a magnetic circuit and the magnetic fluid is retained by the magnetic circuit. The spill preventing portion provided on the polar plate can be made of a resin film attached to the exposed surface of the polar plate such that the projecting wall is flush with the end surface of the polar plate. For such lamination structure, a method of producing the polar plate having the resin film attached thereto comprises the steps of: forming a stacked sheet having lamination structure including a sheet-shaped magnetic member and a sheet-shaped resin sheet stacked on and adhered to a surface of the magnetic member; and punching the stacked sheet to produce a plurality of ring-shaped polar plates having a resin film attached thereto. Since the spill preventing portion is previously attached to the exposed surface of the polar plate, the polar plate can be readily built in and handled.

Advantages

According to the present invention, it is possible to produce a magnetic fluid sealing device and a magnetic fluid sealed bearing in which, even upon penetration of moisture, a magnetic fluid retained between the polar plate and the drive portion can be effectively prevented from spilling, so as to retain waterproofness for a long period.

DESCRIPTION OF THE EMBODIMENTS

Embodiments of a magnetic fluid sealing device according to the disclosure will be hereinafter described with reference to the drawings. In the embodiments described below, the magnetic fluid sealing device is disposed, by way of an example, in a one-way clutch portion of a fishing spinning reel.

Figure 1:
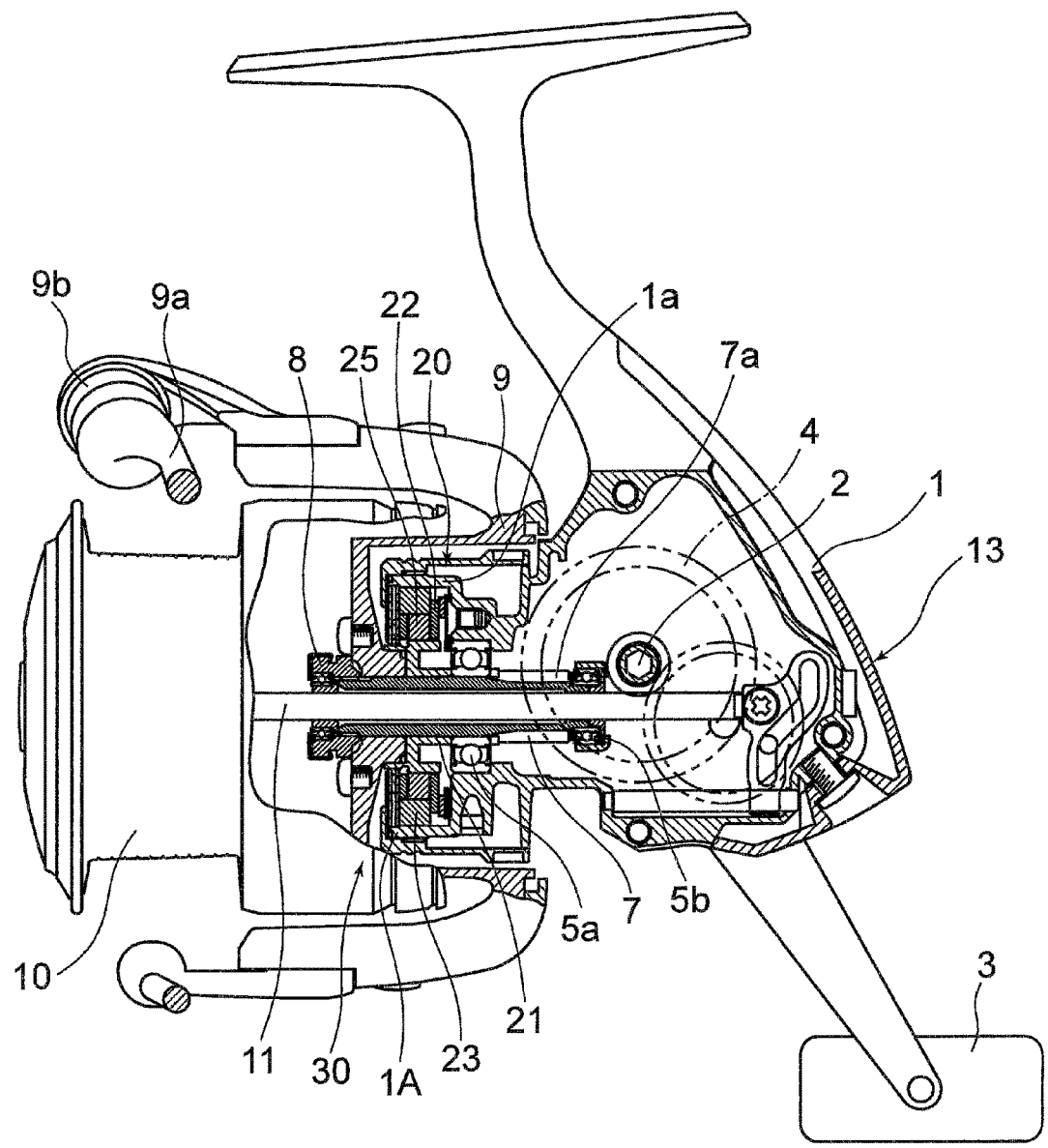
FIG. 1 is a partially sectional view showing a first embodiment of a magnetic fluid sealing device, in which the magnetic fluid sealing device is disposed in a one-way clutch portion of a fishing reel (a spinning reel).
Figure 2:
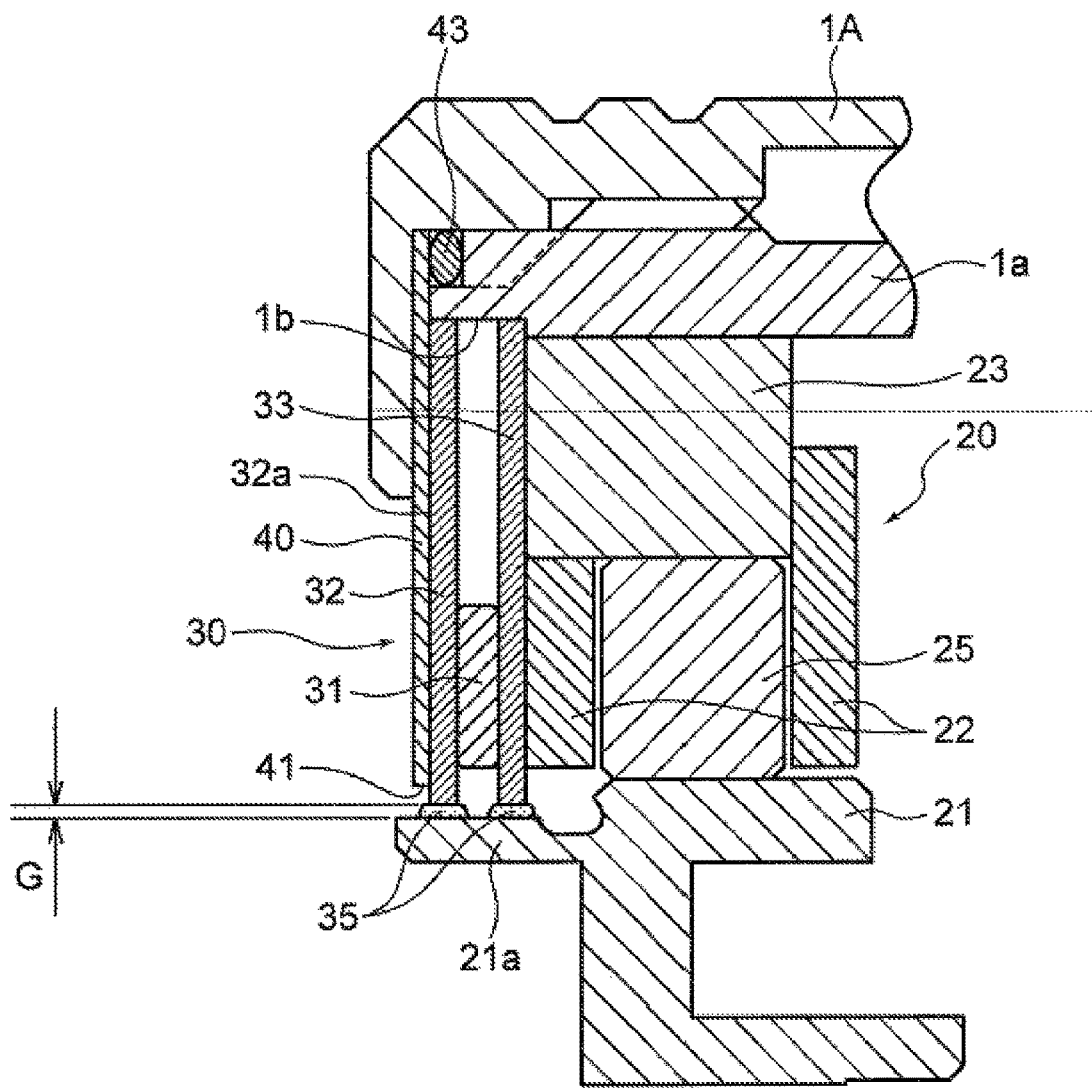
FIG. 2 is an enlarged view of the magnetic fluid sealing device shown in FIG. 1.

FIG. 1 is a partially sectional view showing a magnetic fluid sealing device disposed in a one-way clutch portion of a spinning reel, and FIG. 2 is an enlarged view of the magnetic fluid sealing device shown in FIG. 1. A handle shaft 2 is rotatably supported on the reel body 1 of the spinning reel via bearings (not shown); and a handle 3 for winding operation is mounted on an end of the handle shaft 2. On the handle shaft 2, there is mounted a drive gear 4 so as to be rotatable integrally with the handle shaft 2, and the drive gear 4 meshes with a tooth portion 7a of a pinion gear 7 extending orthogonally to the handle shaft 2 and rotatably supported via bearings 5a, 5b. On the distal end of the pinion gear 7, there is mounted a rotor 9 having a bail 9a and a line guide 9b, with a rotor nut 8 screwed on such that the rotor 9 is rotatable integrally with the pinion gear 7.

The pinion gear 7 has a through-hole extending axially therein, and a spool shaft 11 extends through the through-hole. The spool shaft 11 retains on its distal end a spool 10 around which a fishing line is to be wound. On the proximal end of the spool shaft 11, there is connected a publicly known oscillating mechanism 13. When the handle shaft 2 is rotated by rotational operation of the handle 3, the spool shaft 11 is reciprocated along the axial direction.

On the intermediate portion of the pinion gear 7, there is provided the one-way clutch 20 which is interposed between the pinion gear 7 and the reel body 1 and supports the pinion gear 7 so as to control the rotation thereof. The one-way clutch 20 constitutes a well-known anti-reverse device that prevents rotation (reverse rotation) of the handle 3 (the rotor 9) in the fishing line releasing direction. The one-way clutch 20 includes an inner ring 21 unrotatably fitted around the pinion gear 7, a retainer 22 disposed outside the inner ring 21, an outer ring 23 disposed outside the retainer 22, and a plurality of rolling members (rollers) 25 that are retained inside the outer ring 23 by the retainer 22 so as to be rollable. The one-way clutch 20 is sealed by the magnetic fluid sealing device 30 positioned adjacent thereto.

On the inner circumferential surface of the outer ring 23, there are formed a free rotation region where the rolling members 25 can rotate freely and a wedge region where the rolling members 25 are prevented from rotating. The rolling members 25 are biased toward the wedge region by a spring member (not shown) provided to the retainer 22. The outer ring 23 is unrotatably fixed to the reel body 1. More specifically, locking portions (not shown) protruded from the outer circumferential surface of the outer ring 23 are arranged at regular intervals in the circumferential direction. The locking portions are fitted in locking grooves (not shown) formed in the inner surface of a cylindrical projection 1a that is integrated with the reel body 1, such that the outer ring 23 is unrotatably fixed to the reel body 1.

In such one-way clutch 20, when the inner ring 21 rotates in a positive direction along with the pinion gear 7 (i.e., when the rotor 9 rotates in the fishing line winding direction), the rolling members 25 of the retainer 22 are positioned at the free rotation region of the outer ring 23. Thus, the rotational force of the inner ring 21 is not transmitted to the outer ring 23 (i.e., the rotational force of the inner ring 21 is not hindered by the outer ring 23). Therefore, the rotor 9 can rotate freely along with the pinion gear 7. On the other hand, when the inner ring 21 is about to rotate reversely along with the pinion gear 7 (i.e., when the rotor 9 is about to rotate in the fishing line releasing direction), the rolling members 25 of the retainer 22 are positioned in the wedge region of the outer ring 23, serving as a stopper to prevent the pinion gear 7 and the rotor 9 from rotating (reversely).

Next, the magnetic fluid sealing device 30 disposed in the spinning reel configured as above will be described. The magnetic fluid sealing device 30 of the embodiment is aimed at sealing the one-way clutch 20 as described above. The drive portion of the embodiment (the drive portion provided with the magnetic fluid) is integrated with the inner ring 21, which is a constituent of the one-way clutch 20.

The one-way clutch 20 of the embodiment is housed in a housing cavity formed inside the projection 1a of the reel body 1. The inner ring 21 of the one-way clutch 20 is made of a magnetic material and constitutes a drive portion that rotates integrally with the pinion gear 7. The inner ring 21 of the embodiment includes a projecting portion 21a having a cylindrical shape and projecting toward the spool beyond the front end surfaces of the retainer 22 and the outer ring 23, and the magnetic fluid sealing device 30 is disposed on the projecting portion 21a. That is, the projecting portion 21a is formed integrally with the inner ring which is a constituent of the one-way clutch, and the projecting portion 21a retains the magnetic fluid included in the magnetic fluid sealing device 30 (the projecting portion is hereinafter referred to as the drive portion). Accordingly, the pinion gear 7 may be made of a non-magnetic material (e.g., copper alloys or aluminum alloys)

The magnetic fluid sealing device 30 includes a magnet 31, a pair of polar plates 32, 33, and the magnetic fluid 35. The magnet 31 is positioned at a distance from the drive portion 21a. The pair of polar plates 32, 33 are disposed so as to retain the magnet 31 interposed therebetween and encircle the drive portion 21a. The magnetic fluid 35 is retained by the magnetic circuit formed of the magnet 31, the polar plates 32, 33, and the drive portion 21a. The magnet 31 and the polar plates 32, 33 have ring-like shapes so as to encircle the drive portion 21, making it possible to retain the magnetic fluid 35 in the gap between the polar plates 32, 33 and the drive portion 21a over the entire circumference.

The magnetic fluid 35 is prepared by dispersing magnetic fine particles such as $Fe_3O_4$ in a base oil with a surfactant, so as to have viscosity and react with a magnet brought close. As described above, with the magnetic force of the ring-shaped magnet 31, a magnetic circuit is formed through the polar plates 32, 33 and the drive portion 21a made of a magnetic material, and therefore, the magnetic fluid 35 is retained stably in the annular gap between the polar plates 32, 33 and the drive portion 21a over the entire circumference. That is, the magnetic fluid sealing device 30 which retains the magnetic fluid 35 with the magnetic circuit securely prevents moisture, sand, foreign substances, etc. from penetrating the portion where the one-way clutch 20 is installed, making it possible to stabilize the drive performance of the one-way clutch 20.

The polar plates 32, 33 of the embodiment have the same ring-like shape and retain the ring-shaped magnet 31 interposed therebetween on the radially inner side. The outer circumferential regions of the polar plates 32, 33 are inserted in and fixed to an annular recess 1b formed in the front-end inner circumference of the projection 1a. The polar plate 33 facing the one-way clutch 20 is in surface contact with the front surface of the one-way clutch 20, and the polar plate 32 on the opposite side to the one-way clutch 20 is provided with a spill preventing portion 40 on the front surface (an exposed surface 32a) thereof. The spill preventing portion 40 is projected axially outward from the exposed surface 32a of the polar plate 32, and includes a projecting wall (a protrusion) 41 that prevents spill of the magnetic fluid 35 retained between the drive portion 21a and the polar plates, particularly the polar plate 32 on the exposed side, as described above. More specifically, the projecting wall (the protrusion) 41 is provided on the drive portion 21a side of the exposed surface of the polar plate 32 on the exposed side so as to be distant from the end surface 32b of the polar plate 32. The projecting wall 41 prevents the magnetic fluid 35 retained in the gap G from being removed by moisture and the like in flowing water and thus prevents reduction of the amount of the magnetic fluid, making it possible to retain the waterproofness for a long period.

Figure 3A:
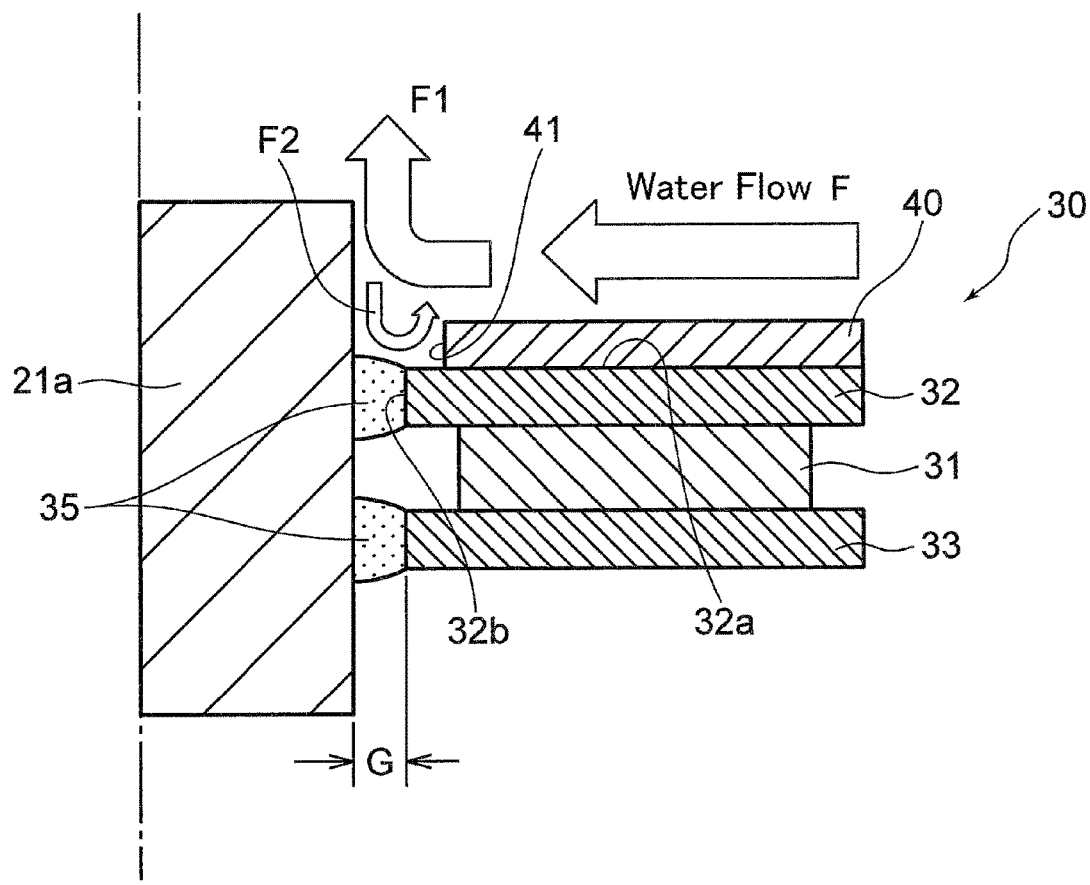
FIG. 3a is a schematic view illustrating the principle of waterproofness of the magnetic fluid sealing device.
Figure 3B:
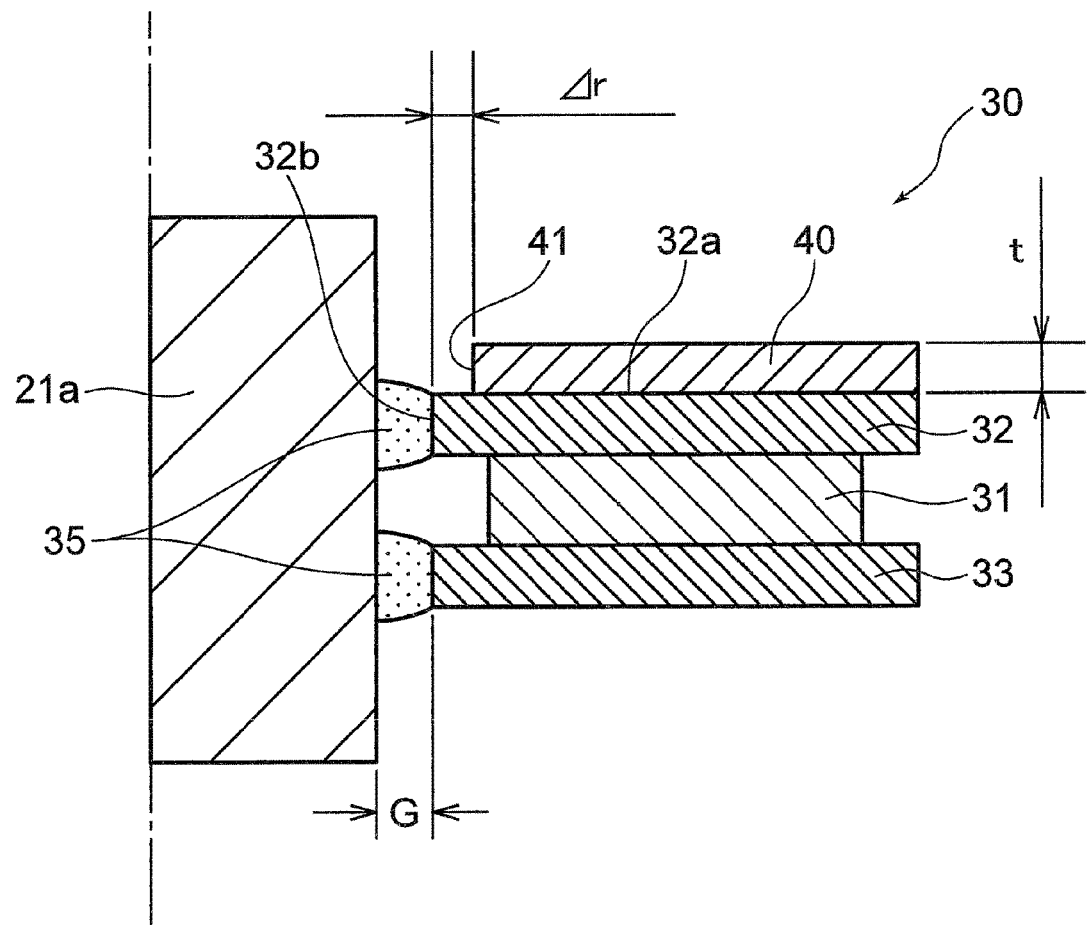
FIG. 3b is a schematic view illustrating a desirable numerical relationship between a spill preventing portion and a polar plate.

The function of preventing spill of the magnetic fluid 35 will now be described in detail with reference to the schematic views of FIGS. 3a and 3b. As shown in FIGS. 3a and 3b, the magnetic fluid 35 retained in the gap G between the polar plate 32 and the drive portion 21a bulges (in a trapezoidal shape) (beyond the exposed surface 32a of the polar plate 32) because of the surface tension and a larger surface of the drive portion relative to the opposed end surface of the polar plate in contact with the magnetic fluid for sealing. Therefore, supposing that the spill preventing portion 40 is absent on the surface of the exposed surface 32a, when water flow F runs as shown by the arrow in the drawing during washing, the water flow F strikes the drive portion 21a and diverts in the axial direction into water flow F1 running as fast as the water flow F. At this time, the water flow F1 acts to draw the magnetic fluid 35. As the water flow F runs repeatedly, the water flow F1 removes the magnetic fluid 35 retained in the gap and gradually reduces the amount of the magnetic fluid.

Because of the presence of the projecting wall (the protrusion) 41 on the drive portion 21a side of the exposed surface of the polar plate 32 at a distance from the end surface 32b, a part of the water flow F striking the drive portion 21a rolls in a recess (a recess formed by the thickness t of the projecting wall) like the water flow F2. Therefore, the water flow F1 that draws the magnetic fluid 35 is weakened (the water flow F is weakened because of the presence of the thickness t). This makes it possible to inhibit the reduction of the amount of the magnetic fluid 35 effectively.

The projecting wall 41 can be installed by, for example, providing the exposed surface of the polar plate 32 with the spill preventing portion 40 having substantially the same ring-like shape as the polar plate 32. The spill preventing portion 40 may be made of a magnetic material (a metal material having ferromagnetism such as iron and nickel) integrally with or separately from the polar plate 32 to be integrated therewith, or made of a non-magnetic metal material (such as copper and aluminum) or a non-magnetic resin material (such as PET and polypropylene) integrally on the exposed surface of the polar plate 32. When the spill preventing portion 40 is made of a magnetic material, the spill preventing portion 40 forms a magnetic circuit integrally with the polar plate 32, and thus the magnetic fluid may also be retained in the gap on the spill preventing portion 40. Therefore, when the spill preventing portion 40 is made of a magnetic material, it is necessary that, as shown in FIG. 3b, the spill preventing portion 40 is positioned so as to leave a radial distance Δr (delta r) between the end surface 32b of the polar plate 32 (facing the drive portion 21a) and the projecting wall 41 provided so as to be distant radially outward from the end surface 32b. Naturally, the spill preventing portion 40 in the configuration as shown in FIG. 3b may be formed of a non-magnetic material.

As shown in FIG. 3b, a projecting wall 41 is provided so as to be distant radially outward from the end surface 32b of the polar plate 32, thereby to provide a step on the exposed surface 32a of the polar plate 32, such that the water flow F is weakened as described above. This effect of weakening the water flow varies depending on a numerical relationship (the ratio between the radial distance and the thickness: t/Δr), where t is the thickness of the projecting wall 41 for forming the step, and Δr is the radial distance from the end surface 32b of the polar plate 32 to the projecting wall 41.

Figure 4A:
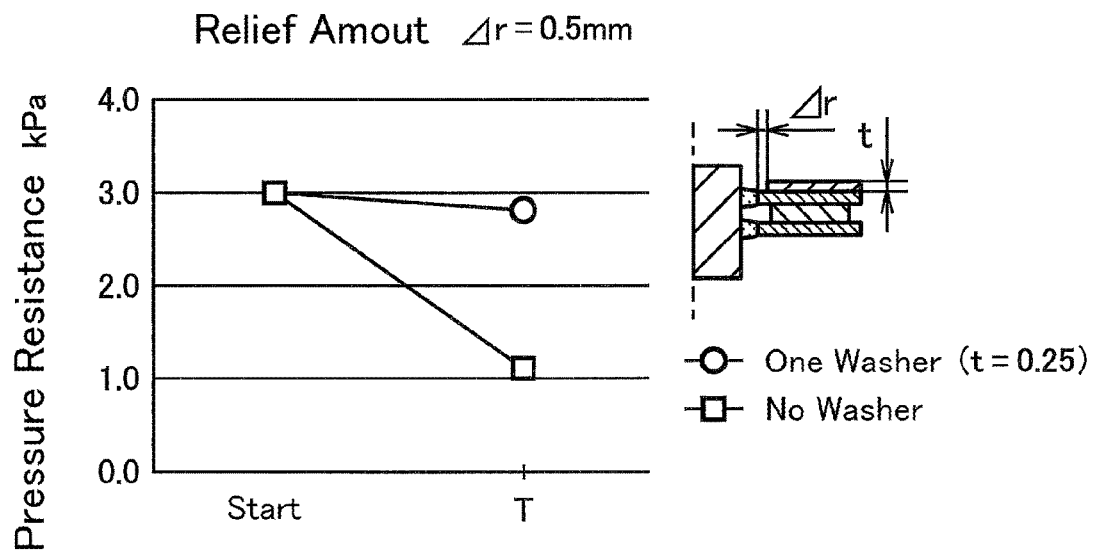
FIG. 4a shows a result of a test for investigating desirable range of the thickness of a step formed by the spill preventing portion shown in FIG. 3b and the thickness of the spill preventing portion.
Figure 4B:
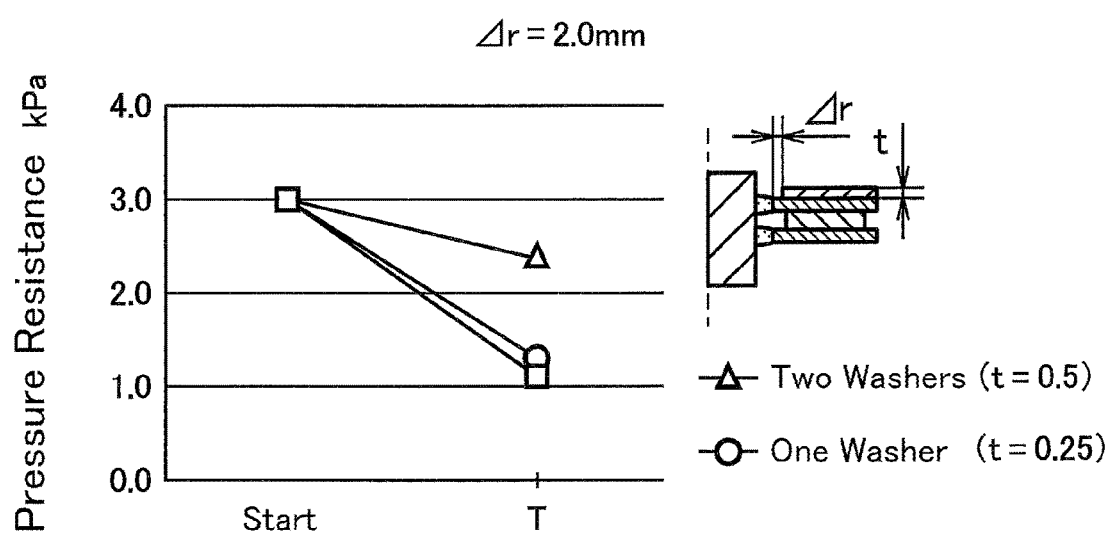
FIG. 4b shows a result of a test for investigating desirable range of the thickness of a step formed by the spill preventing portion shown in FIG. 3b and the thickness of the spill preventing portion.

With reference to FIGS. 4a and 4b, a description will now be given of a test for investigating a desirable numerical relationship for forming a step on the exposed surface of the polar plate 32 by the projecting wall 41, as well as the result of the test. The test was performed as follows. A structure including the drive portion and the magnetic fluid sealing device disposed thereon was placed in a sealed space. Water flow from shower is allowed to run on the sealing portion for a predetermined period of time (T minutes). Then, the reduction of the pressure resistance of the sealing film from its initial value was measured.

As shown in FIG. 4a, the above test was performed on the structure with a tabular washer (W) having a thickness of 0.25 mm constituting the spill preventing portion and positioned such that the radial distance (relief amount) Δr is 0.5 mm (t/Δr=½). As a result, there was almost no change in the pressure resistance after the predetermined period of time (T) elapsed. For the structure without the washer (W) (without the spill preventing portion), the pressure resistance was reduced to about one-third, indicating that a considerable amount of the magnetic fluid had spilled, failing to maintain stable sealing performance.

As shown in FIG. 4b, the above test was performed on the structure with two washers (W) positioned such that the radial distance (relief amount) Δr is 2.0 mm (t=0.5 mm, t/Δr=¼). As a result, the pressure resistance was maintained at 80% of its initial value after the predetermined period of time (T) elapsed. This indicates that the amount of the magnetic fluid that had spilled is small, and the stable sealing performance was maintained. For the structure without the washer (W) and the structure having one washer (W) (t/Δr=⅛), the pressure resistance was reduced to about one-third, as with the structure without the washer (W) of FIG. 4a, indicating that a considerable amount of the magnetic fluid had spilled, failing to maintain stable sealing performance.

These test results indicate that when the spill preventing portion having the thickness t and provided on the exposed surface of the polar plate is constituted by a step provided on the drive portion side of the exposed surface of the polar plate, the formula t/Δr≥¼ should preferably be satisfied. Further, the thickness t should preferably be larger than the gap G in which the magnetic fluid is retained.

With the above-described magnetic fluid sealing device 30 disposed on the drive portion of the spinning reel, even when the reel body is washed with water or showered after use, the flowing rate of the water flowing on the exposed surface 32a of the polar plate 32 on the exposed side and acting on the magnetic fluid 35 is weakened, and therefore, a smaller portion of the magnetic fluid 35 retained by the magnetic force is removed by the water flow. As a result, the reduction of the amount of the magnetic fluid is inhibited, making it possible to maintain the waterproofness for a long period.

Since the spill preventing portion 40 described above needs only to have simple structure with the projecting wall 41 to enhance the waterproofness, there is no need of providing a labyrinth structure or the like in the peripheral parts of the magnetic fluid sealing device so as to cover the sealing portion. Therefore, the thicknesses of the peripheral parts of the magnetic fluid sealing device can be reduced positively, making it possible to reduce the weight and improve the design. Further, as described above, the sealing film constituted by the magnetic fluid 35 tends to bulge toward the exposed side because of the surface tension and the amount of the magnetic fluid 35 required for sealing, and therefore, the sealing film is prone to adhere to outside objects such as a hand. However, the spill preventing portion 40 provided as described above prevents contact with the magnetic fluid during build-in work or handling, making it possible to improve the ease of handling and efficiency of the build-in work.

As shown in FIG. 2, the magnetic fluid sealing device 30 as described above can be readily built in by inserting the ring-shaped polar plates 32, 33 retaining the magnet 31 interposed therebetween into an annular recess 1b formed in the front-end inner circumference of the projection 1a of the reel body 1, placing the spill preventing portion 40 made of a separate member and having a ring-like shape on the exposed surface 32a of the polar plate 32, and fixing these elements with a cap (a fixing part) 1A mounted on the outer circumference of the projection 1a. The cap 1A can be mounted on the projection 1a either by screwing or by press-fitting. Since the spill preventing portion 40 is placed on the end surface of the projection 1a, it is preferable to provide a sealing member (O-ring) 43 in the surface-contact region between the spill preventing portion 40 and the projection 1a. That is, the spill preventing portion 40, having a tabular and ring-like shape, needs only to be placed and thus can be readily built in.

Next, another embodiment of the disclosure will be described. In the following description of the embodiment, the same or similar elements will be denoted by the same reference numerals and detailed descriptions thereof will be omitted. The configuration described below is characterized in the simple method of building the magnetic fluid sealing device into the reel body.

Figure 5:
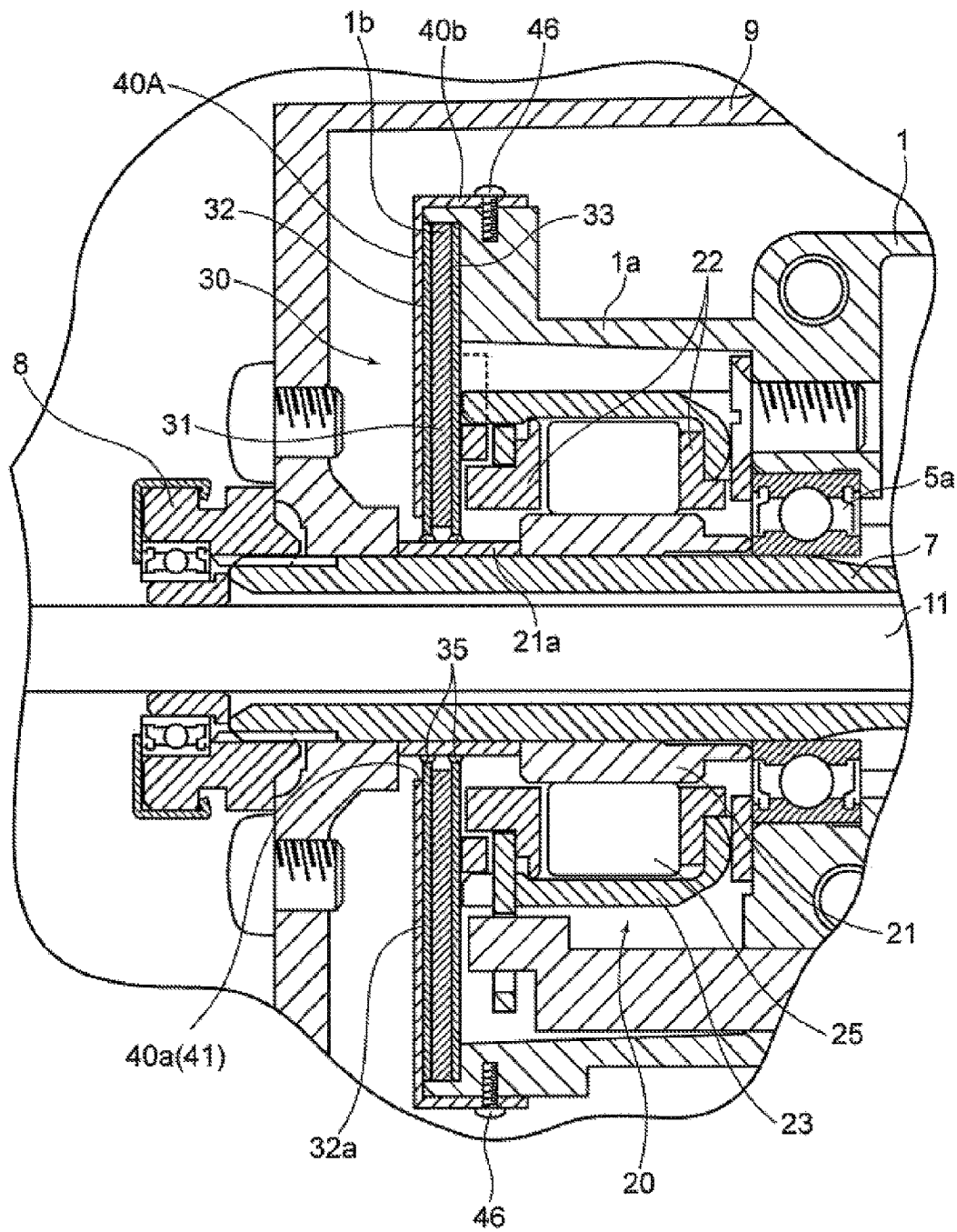
FIG. 5 is a sectional view showing a second embodiment of the magnetic fluid sealing device, in which the magnetic fluid sealing device is disposed in a one-way clutch portion of a spinning reel.

FIG. 5 shows a second embodiment of the magnetic fluid sealing device, in which the magnetic fluid sealing device is disposed in a one-way clutch portion of a spinning reel. In this embodiment, the magnetic fluid sealing device 30 is inserted into the annular recess 1b formed in the front-end inner circumference of the projection 1a of the reel body 1, and then placing on the surface of the exposed surface 32a of the polar plate 32 a spill preventing portion 40A having a circular opening 40a in the middle portion thereof and having a cap-like shape so as to form the step as described above. In placing the spill preventing portion 40A, an annular portion 40b of the spill preventing portion 40A is press-fitted onto the outer circumferential portion of the projection 1a, and small screws 46 are screwed in through the outer circumferential surface of the projection 1a, thereby to build in the magnetic fluid sealing device 30. The small screws 46 are arranged at regular intervals in the circumferential direction. For example, four screws are provided at intervals of 90° in the circumferential direction. In this embodiment, the spill preventing portion has a cap-like shape and is screwed to the reel body with small screws, but there is no limitation in the method of installing the spill preventing portion. For example, it is also possible to screw (fasten) the spill preventing portion with screws.

Figure 6:
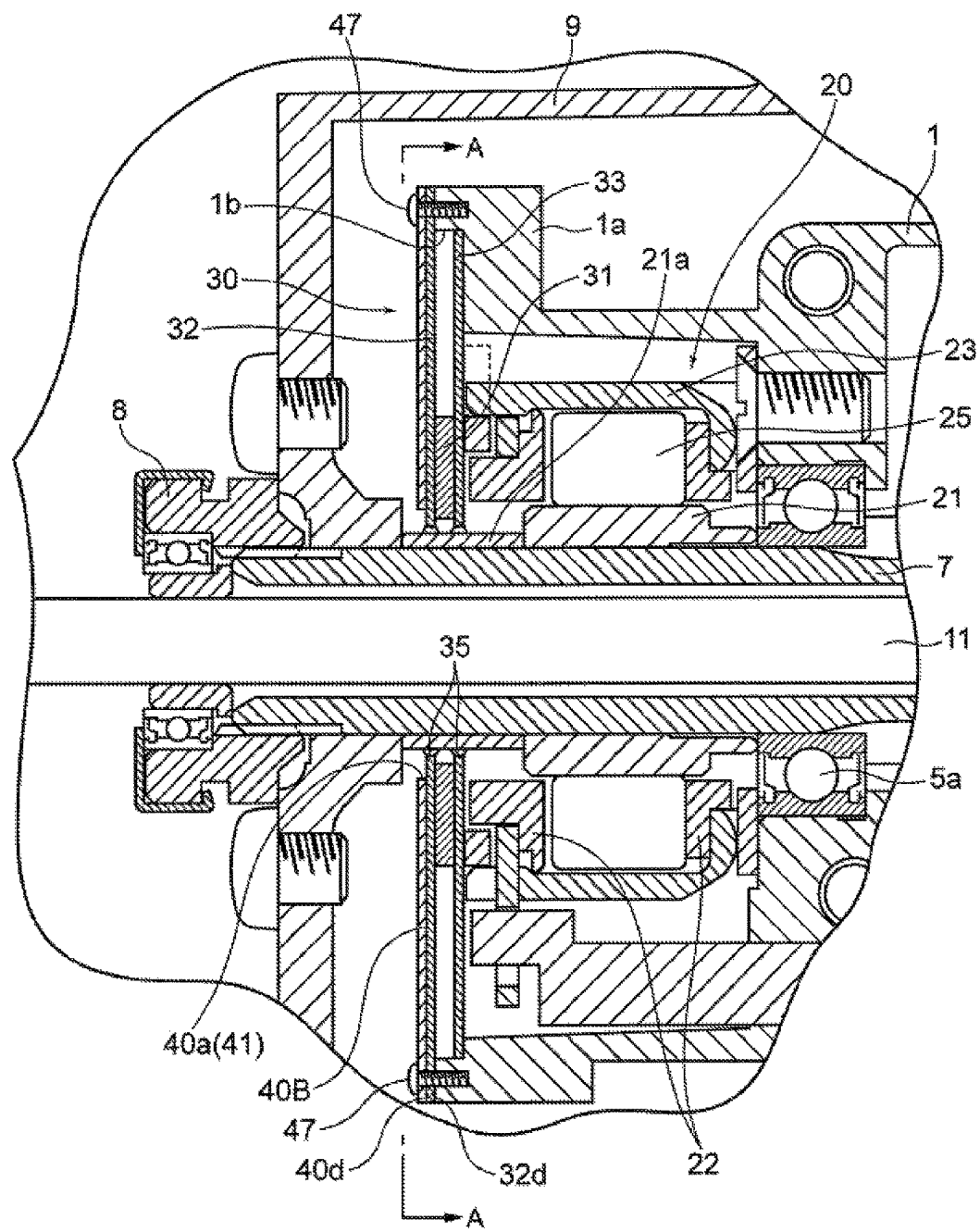
FIG. 6 is a sectional view showing a third embodiment of the magnetic fluid sealing device, in which the magnetic fluid sealing device is disposed in a one-way clutch portion of a spinning reel.
Figure 7:
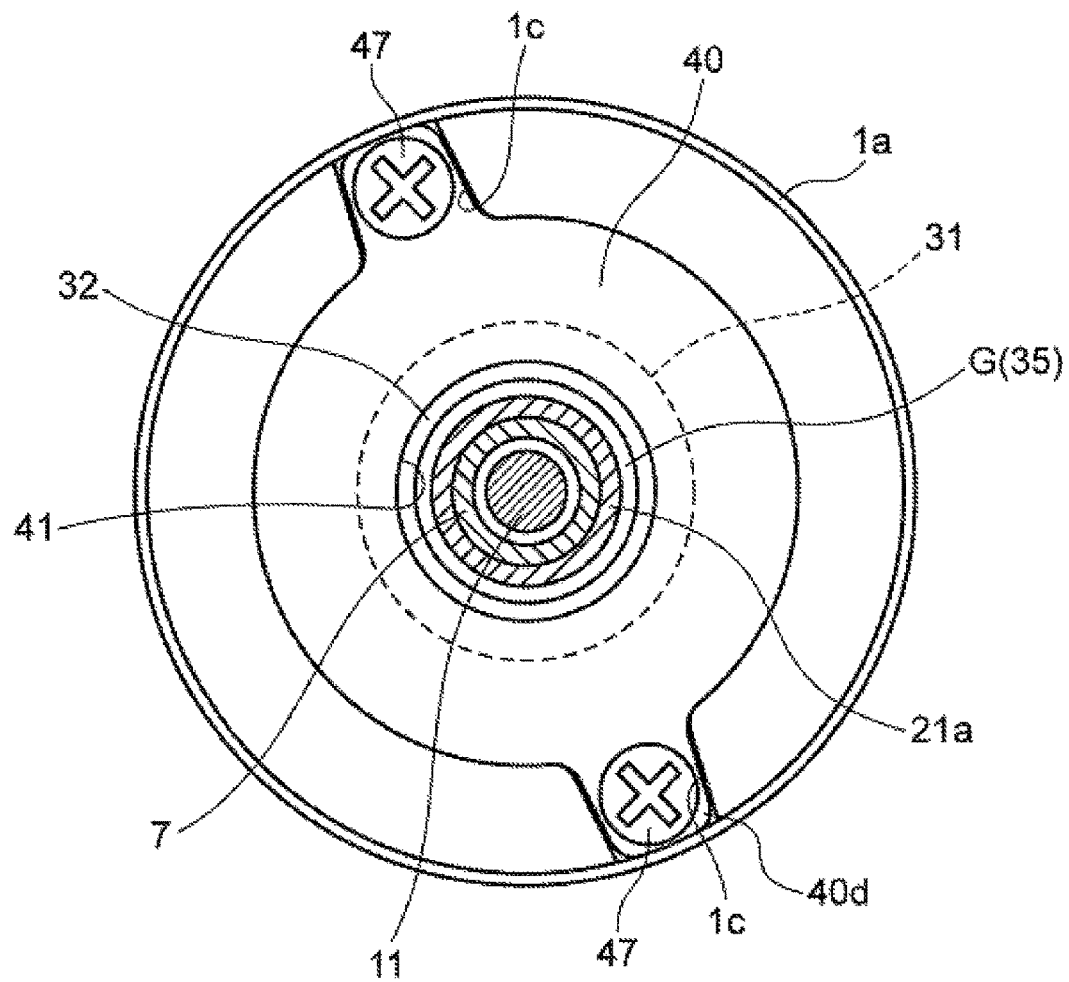
FIG. 7 is a cross sectional view along the line A-A in FIG. 6.

FIGS. 6 and 7 show a third embodiment of the magnetic fluid sealing device. FIG. 6 is a sectional view showing that the magnetic fluid sealing device is disposed in a one-way clutch portion of a spinning reel, and FIG. 7 is a sectional view along the line A-A in FIG. 6. In this embodiment, the polar plate 33 having the magnet 31 fixed thereto is inserted into the annular recess 1b formed in the front-end inner circumference of the projection 1a of the reel body 1, and a lamination structure constituted by the polar plate 32 and a spill preventing portion 40B stacked together is placed on the magnet 31 so as to abut against the front-end surface of the projection 1a. As shown in FIG. 7, the front-end surface of the projection 1a has a plurality of fitting recesses 1c formed therein. The plurality of fitting recesses 1c are arranged at regular intervals in the circumferential direction (in this embodiment, two fitting recesses 1c are provided with an interval of 180°). The ring-shaped polar plate 32 and the spill preventing portion 40B that constitute the lamination structure respectively have projecting pieces 32d, 40d projecting radially and having a screw hole formed therein. The projection pieces 32d, 40d are located at positions corresponding to those of the fitting recesses 1c.

The polar plate 32 and the spill preventing portion 40B that constitute the lamination structure are installed so as to abut against the magnet 31, and the small screws 47 are screwed axially into the screw holes in the projecting pieces 32d, 40d that are aligned with each other, thereby to build in the magnetic fluid sealing device.

In the above embodiments, the spill preventing portion having the projecting wall 41 that is distant from the end surface 32b of the polar plate 32 is made of a ring-shaped plate (a washer) having substantially the same radius as the polar plate 32, and the ring-shaped plate is placed on the polar plate 32 and integrally built in, but there is no particular limitation in the method of installing the spill preventing portion so as to form the step of the projecting wall 41 on the drive portion side of the exposed surface 32a of the polar plate 32 on the exposed side. For example, as shown in FIG. 8, the spill preventing portion may be previously formed integrally with the polar plate or adhered to the same.

Figure 8:
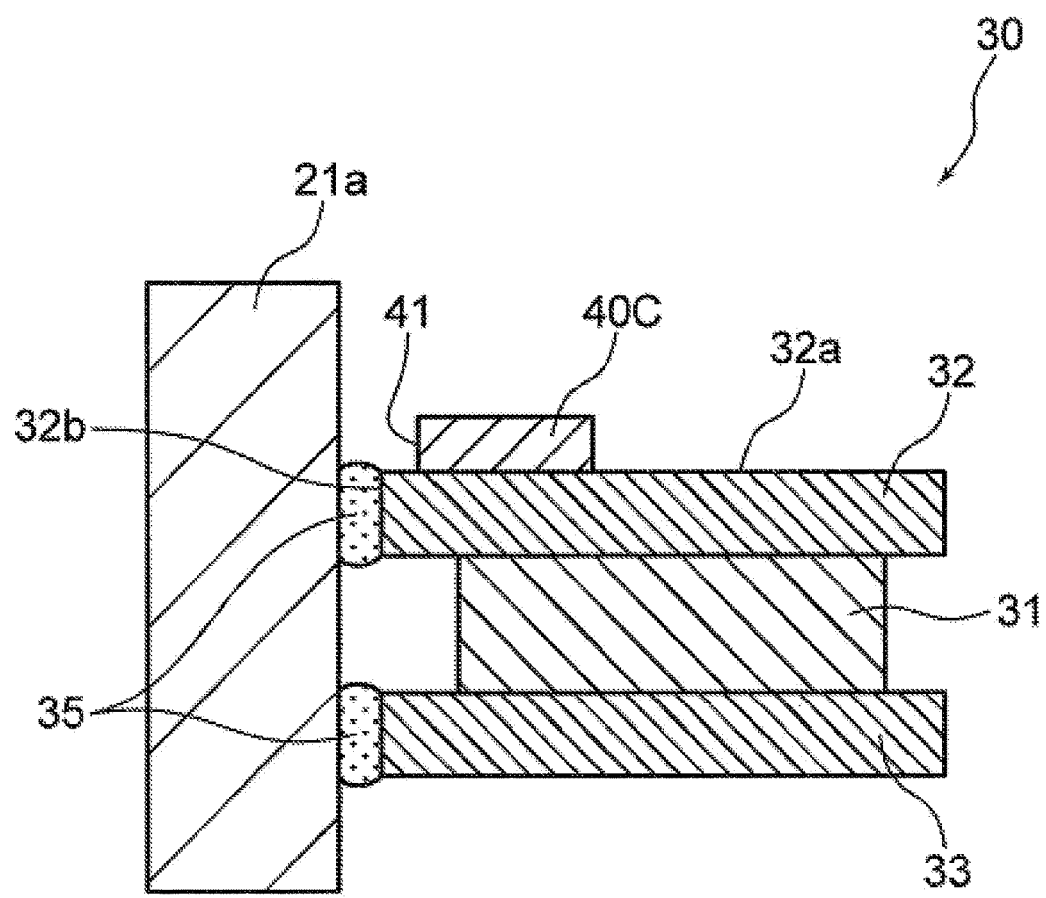
FIG. 8 shows a first variation of the spill preventing portion of the magnetic fluid sealing device.
Figure 9A:
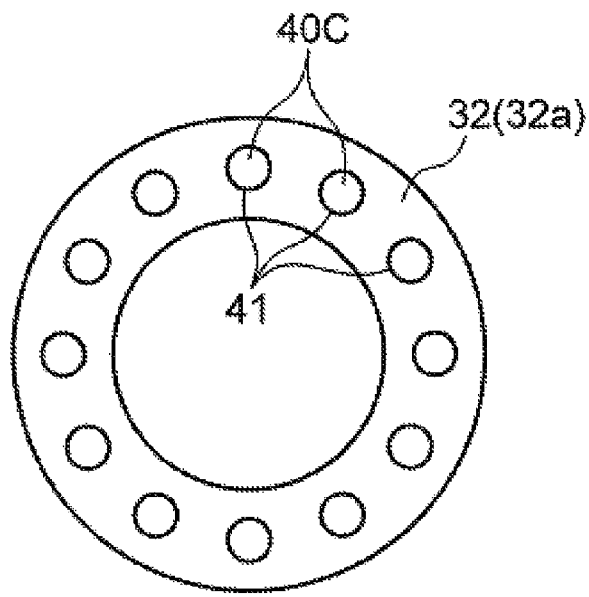
FIG. 9a is a plan view showing the configuration of the spill preventing portion of FIG. 8.
Figure 9B:
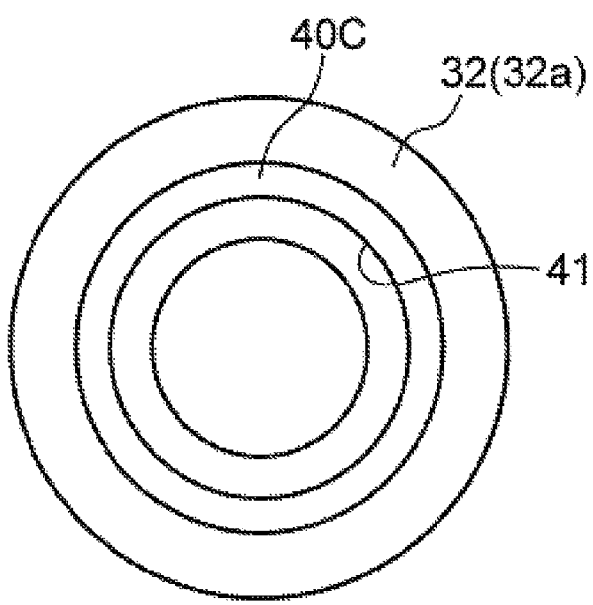
FIG. 9b is a plan view showing a second variation of the spill preventing portion.

For example, the spill preventing portion 40C shown in FIG. 8 is provided so as to project on the drive portion side of the exposed surface of the polar plate 32. The spill preventing portion 40C may be formed integrally with the polar plate 32 (by, e.g., insert molding) or made of a separate member adhered to the polar plate 32 by an adhesive. As to its shape, the spill preventing portion 40C may be made of a plurality of convex members (having a circular or rectangular shape) arranged at regular intervals in the circumferential direction, as shown in FIG. 9a, or it may be made of a narrow ring having a small width in the radial direction and projected to be continuous through 360° to form an annular shape (either circular or non-circular), as shown in 9b, or it may be partially cut so as not to be continuous circularly. Further, the spill preventing portion 40C may have a large number of protrusions formed by roughening the exposed surface of the spill preventing portion.

Figure 10A:
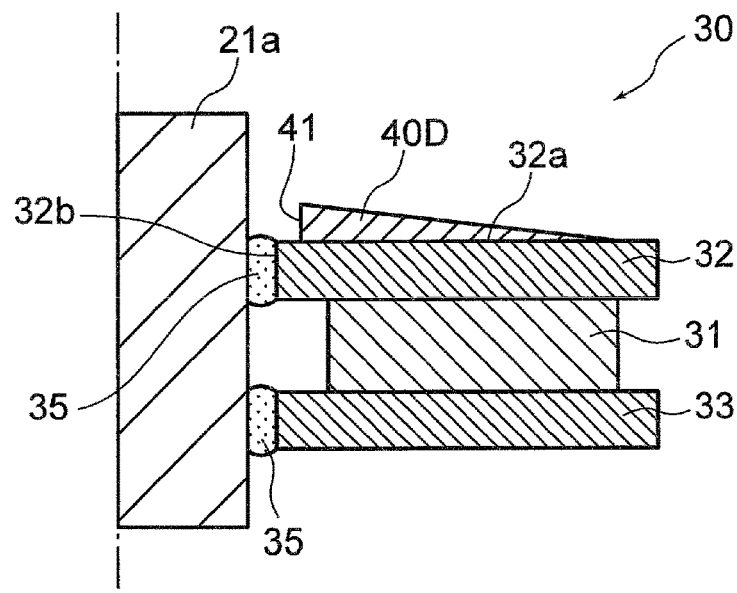
FIG. 10a shows a third variation of the spill preventing portion of the magnetic fluid sealing device.

The spill preventing portion is only specified to form on the drive portion side the projecting wall 41 distant from the end surface 32b of the polar plate 32, and there is no particular limitation in the shape thereof radially outside the projecting wall 41. For example, the spill preventing portion 40D shown in FIG. 10a is thinner radially outward. The spill preventing portion may have a section that is not rectangular, and it may also have a size either shorter or longer than the polar plate 32 in the radial direction.

Figure 10B:
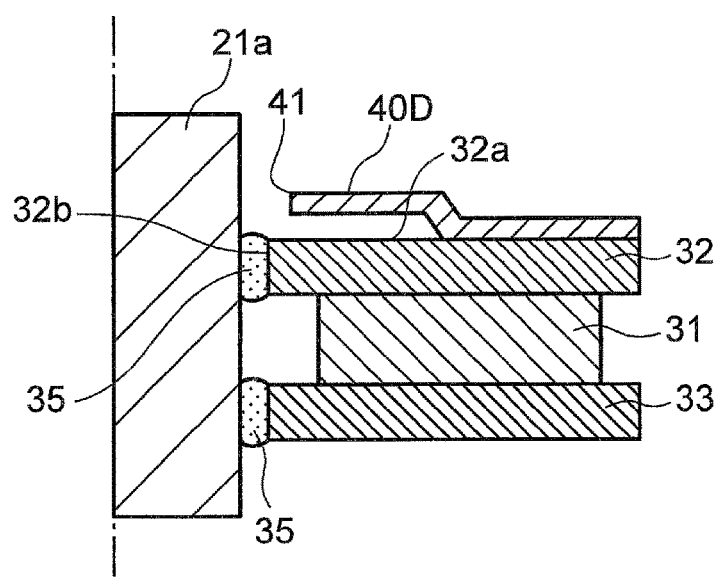
FIG. 10b shows a fourth variation of the spill preventing portion of the magnetic fluid sealing device.
Figure 10C:
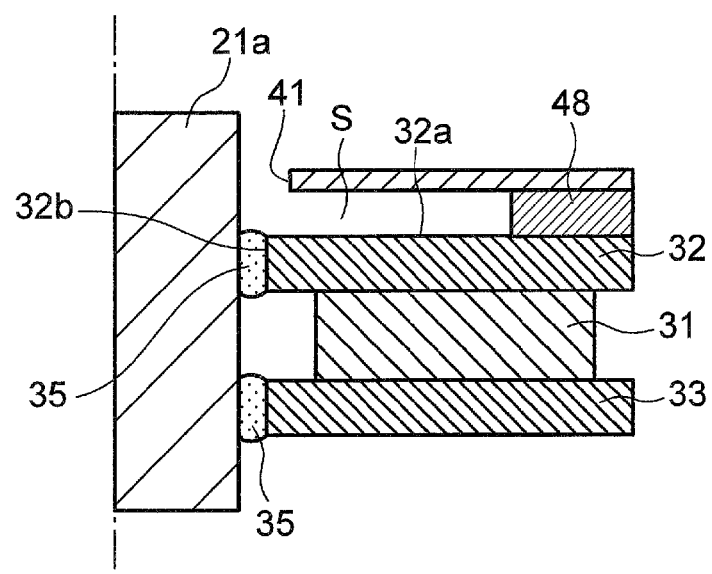
FIG. 10c shows a fifth variation of the spill preventing portion of the magnetic fluid sealing device.

The spill preventing portion 40D may be bent such that a portion thereof is not in contact with the exposed surface 32a of the polar plate 32 on the drive portion side (see FIG. 10b), or a separate member 48 may be interposed between the spill preventing portion 40D and the polar plate 32 (see FIG. 10c) to form a gap S. In these arrangements, even when moisture penetrates the magnetic sealing portion, the presence of the step causes the moisture to accumulate around the magnetic fluid and reduces the removal of the magnetic fluid. Further, when the spill preventing portion is partially separate from the polar plate, the magnetic fluid may be drawn into a gap formed therebetween. However, in the arrangement shown in FIGS. 10b and 10c, the mating surface between the spill preventing portion 40D and the polar plate 32 is sufficiently distant from the magnetic fluid 35, and therefore, the magnetic fluid is prevented from being drawn into the gap. In such an arrangement, the spill preventing portion 40D can have a small thickness, making it possible to reduce the weight.

The projecting wall 41 formed by the spill preventing portion is only specified to protrude axially from the exposed surface of the polar plate on the exposed side, and is not necessarily specified to have a wall surface perpendicular to the exposed surface 32a. For example, the wall surface may be sloped or curved.

Figure 11:
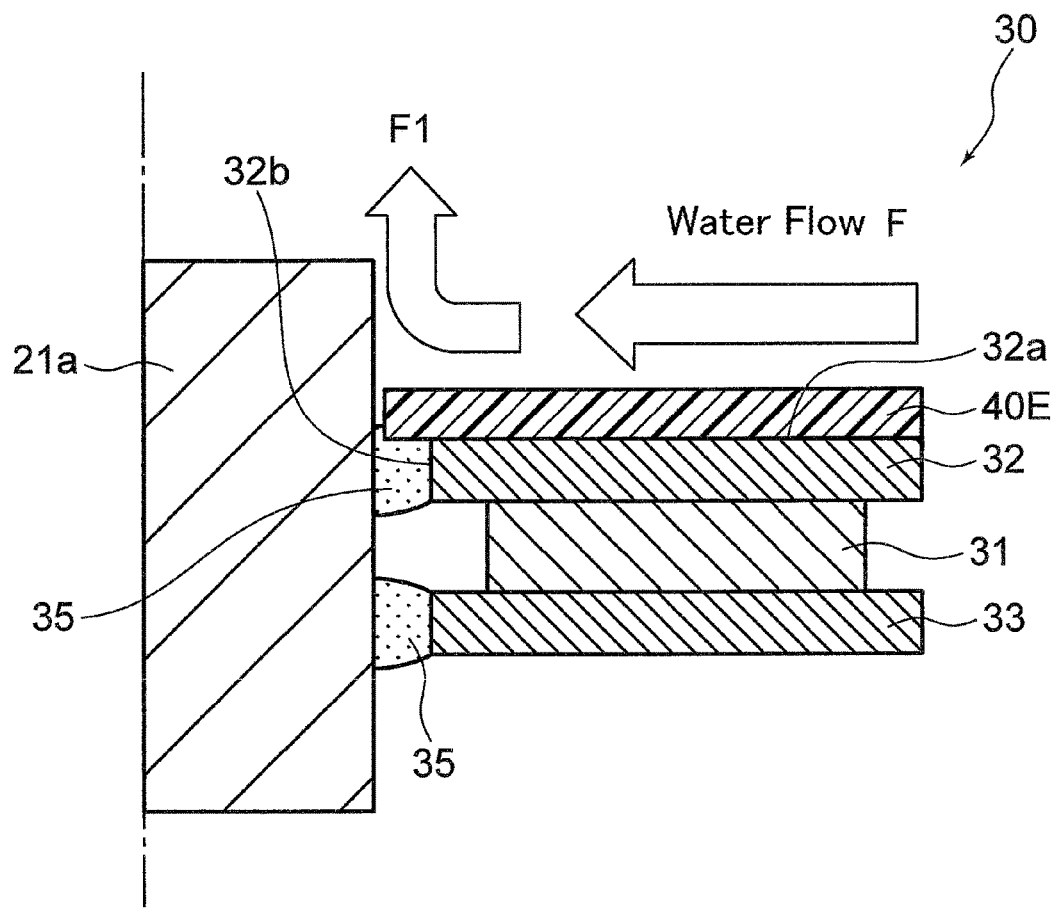
FIG. 11 shows a sixth variation of the spill preventing portion, which is made of a non-magnetic material, and schematically illustrates the principle of waterproofness.

Further, it is also possible that the spill preventing portion is made of a non-magnetic material such as a resin. When the spill preventing portion is made of a non-magnetic material, no magnetic fluid is retained between the spill preventing portion and the drive portion. Therefore, as with the spill preventing portion 40E in FIG. 11, the projecting wall 41 distant from the end surface 32b can be positioned as close to the drive portion 21a as possible (the projecting wall 41 can be disposed radially inside the end surface 32b of the polar plate 32), or the projecting wall 41 can be flush with the end surface 32b of the polar plate 32 ($\Delta r=0$). In this arrangement, as shown in FIG. 11, the water flow F running as indicated by the arrow strikes the drive portion 21a and entirely diverts into the water flow F1. Therefore, the water can be prevented from penetrating the magnetic fluid portion, that is, the water can be prevented from removing the magnetic fluid, and thus reduction of the amount of the magnetic fluid can be effectively prevented.

The method of providing the non-magnetic material such as a resin on the exposed surface of the polar plate may include, for example, applying a coat on the surface of the exposed surface (with masking) or laminating the polar plate and the non-magnetic material to form a resin film on the exposed surface of the polar plate as will be described later, instead of abutment or adhesion of a tabular member (a washer) as described above.

Figure 12:
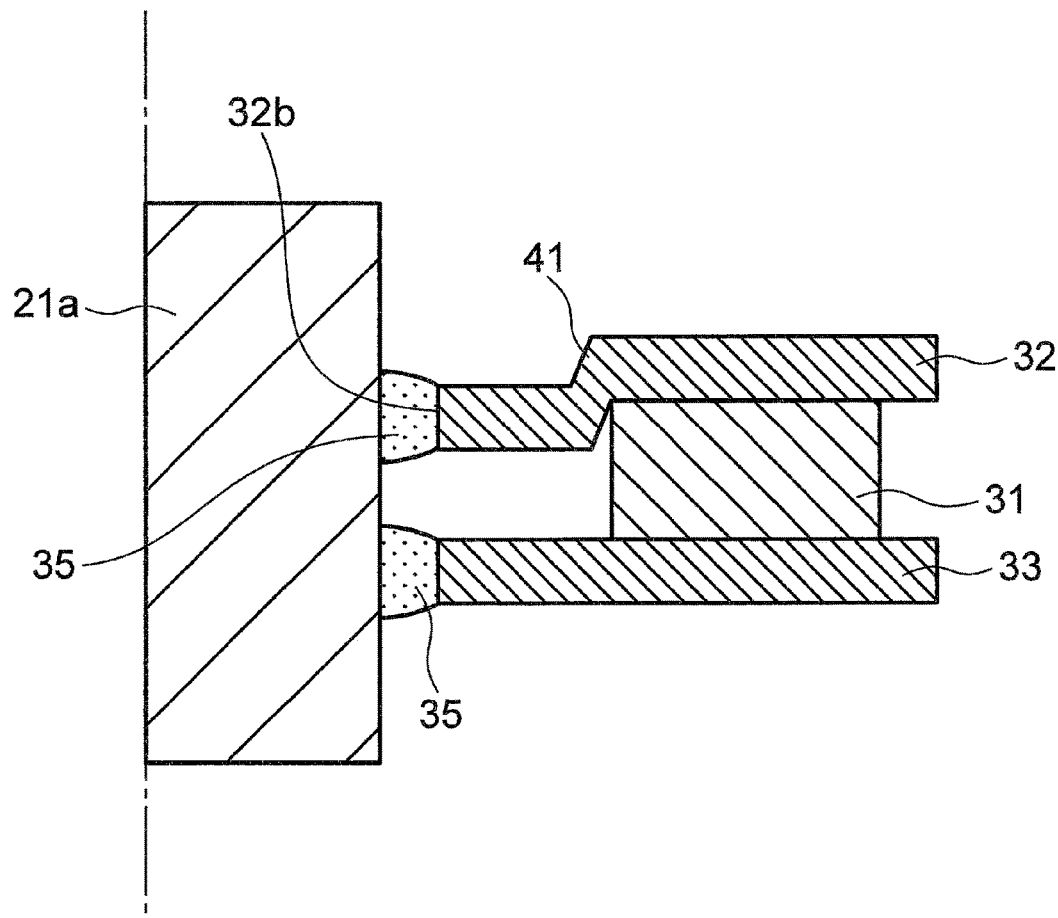
FIG. 12 shows a seventh variation of the spill preventing portion of the magnetic fluid sealing device.

In the above embodiment, the spill preventing portion is formed (stacked) on the exposed surface of the polar plate so as to project therefrom. As shown in FIG. 12, it is also possible that a portion of the polar plate 32 on the drive portion 21a side is bent axially inward to form a sloped step that constitutes the projecting wall 41 distant from the end surface 32b of the polar plate 32. In this arrangement, even when moisture penetrates the magnetic sealing portion, the presence of the step causes the moisture to accumulate around the magnetic fluid and reduces the removal of the magnetic fluid. Since the step can be formed by bending the polar plate 32, it is not necessary to provide or shape a separate member, making it possible to reduce the number of parts, required space, weight, and costs.

The magnetic fluid sealing device 30 as described above can be installed on drive portions at various locations in a drive force transmission mechanism of a fishing reel or the like, and it can also be built into bearings that support a drive shaft rotatably. Embodiments of a bearing having a built-in magnetic fluid sealing structure as described above will be hereinafter described. In the arrangements described below, the polar plates and the magnet that constitute the built-in magnetic fluid sealing structure are the same as or similar to those in the magnetic fluid sealing device 30, and thus these elements are denoted by the same reference signs and detailed description thereof will be omitted.

Figure 13:
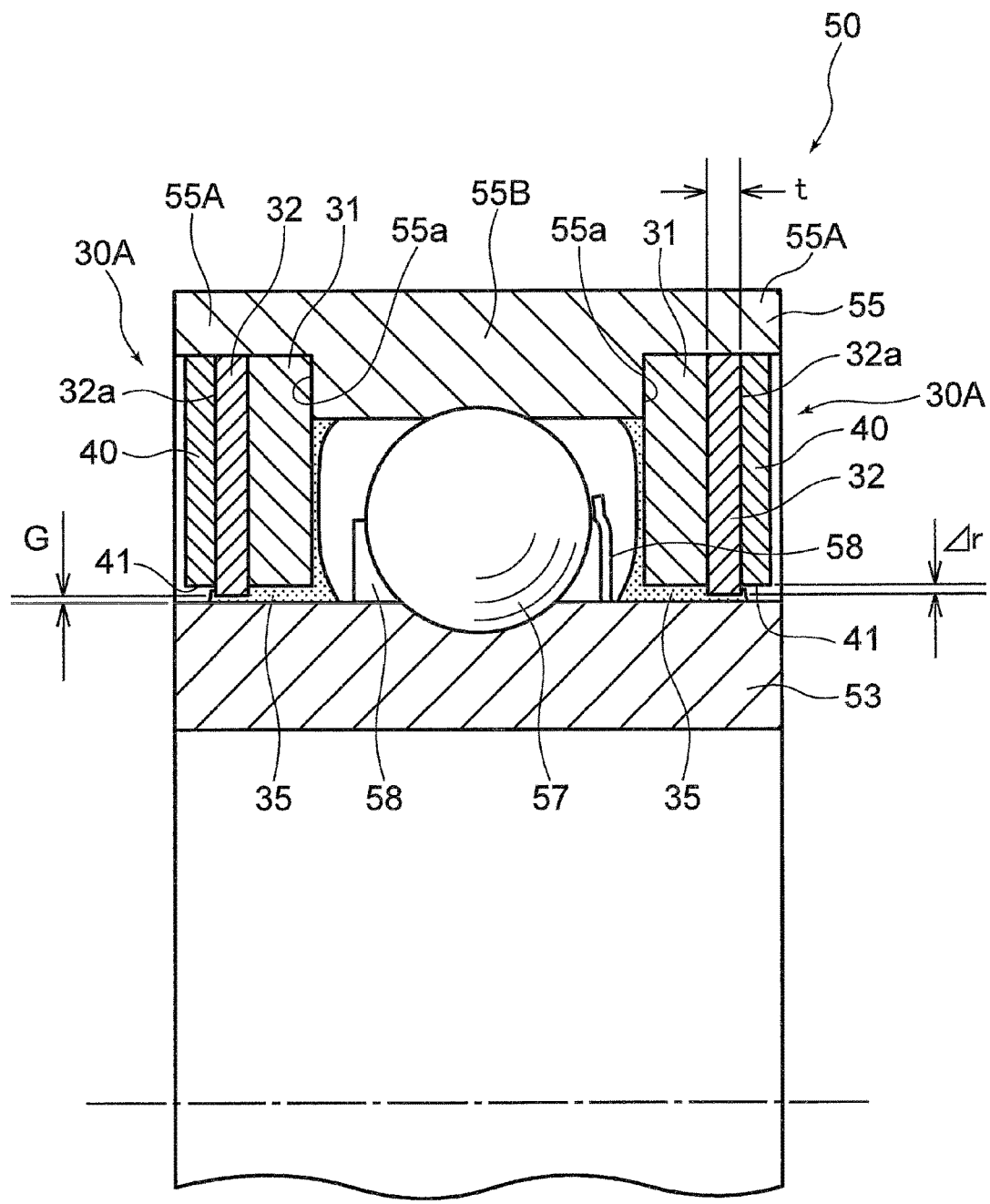
FIG. 13 shows a first embodiment of a magnetic fluid sealed bearing according to the disclosure.

FIG. 13 shows a first embodiment of a magnetic fluid sealed bearing according to the disclosure. A magnetic fluid sealed bearing 50 (hereunder also referred to as "the bearing") according to the embodiment includes a cylindrical inner ring 53, a cylindrical outer ring 55 encircling the inner ring 53, and a plurality of rolling elements (rolling members) 57 placed between the inner ring 3 and the outer ring 55. The rolling elements 57 are retained by a retainer 58 extending in the circumferential direction and allow the inner ring 53 and the outer ring 55 to rotate relative to each other.

The inner ring 53, the outer ring 55, and the rolling elements 57 are formed of a magnetic material such as chrome-based stainless steel (SUS440C), and the retainer 58 is formed of a material that resists corrosion and heat such as a stainless steel material (SUS304). The rolling elements 57 may not necessarily be made of a magnetic material. The inner ring 53 and the outer ring 55 of the embodiment have exposed surfaces that are flush with each other, but it is also possible that one of the inner ring 53 and the outer ring 55 has a larger length in the axial direction.

On the opposite opening sides between the inner ring 53 and the outer ring 55, there are installed magnetic fluid seals 30A in which a gap is formed on the inner ring side and the magnetic fluid 35 is retained in this portion so as to seal the interior. The magnetic fluid seal 30A includes a ring-shaped magnet 31, a ring-shaped polar plate 32 disposed on the axially outer side surface of the magnet 31, and a magnetic fluid 35 retained in the magnetic circuit formed by the magnet 31. The magnetic fluid 35 is filled in a fine gap on the outer ring side, in addition to the gap G on the inner ring side, making it possible to seal the interior (the interior including the rolling elements 57 and the retainer 58) to prevent penetration of dust, moisture, or the like.

The magnet 31 is previously magnetized such that the magnetic poles (the S-pole and the N-pole) thereof point in the axial direction (the axial direction X of the bearing), and the magnet 31 is disposed such that the axially outer side surface thereof abuts against the polar plate 32. The polar plate 32 has substantially the same shape as the magnet 31 and is formed of a magnetic material such as chrome-based stainless steel (SUS440C). The magnet 31 and the polar plate 32 may be or may not be previously bonded to each other. When these two elements are previously bonded to each other, the magnet 31 can be readily positioned or centered, and the magnet 31 and the polar plate 32 are integrated into a unit that can be readily built in.

In the inner surface of the outer ring 55, steps 55a are formed toward the rolling elements. Because of the presence of the steps 55a, the outer ring 55 include thin regions 55A near the both openings and a thick region 55B near the rolling elements. Thus, the distance between the inner ring and the outer ring is larger in the axially outer regions than in the axially inner region. The step 55a attracts the outer peripheral portion of the magnet 31 to position and fix the magnet 31. The polar plate 32 has an outer diameter substantially equal to the inner diameter of the outer ring 55 (the inner diameter of the thin region 55A) and is press-fitted into the opening of the outer ring 55 along with the magnet 31 bonded thereto. The polar plate 32 has such a size as to create a gap G with the outer circumferential surface of the inner ring 53 when press-fitted into the outer ring 55 along with the magnet 31 bonded to the polar plate 32.

The polar plate 32 is positioned on the exposed side toward the opening. On the exposed surface of the polar plate 32, there is provided a spill preventing portion 40 configured as described above (the projecting wall 41 has a thickness t, and the radial distance from the end surface 32b of the polar plate 32 to the projecting wall is Δr). As shown in FIGS. 3a and 3b, the spill preventing portion 40 serves to prevent spill of the magnetic fluid 35 retained between the inner ring 53 included in the drive portion, and the polar plate 32 and the magnet 31. As in the embodiments described above, the spill preventing portion 40 may be made of a magnetic material or a non-magnetic material. When the spill preventing portion is made of a non-magnetic material, no magnetic fluid is retained between the spill preventing portion and the inner ring 53. Therefore, as with the spill preventing portion 40E shown in FIG. 11, the projecting wall 41 can be positioned as close to the drive portion 21a as possible, or the projecting wall 41 can be flush with the end surface 32b of the polar plate 32. Naturally, the spill preventing portion 40 provided on the polar plate 32 may be configured as in the embodiments described above.

Even when the main body of an apparatus including the bearing 50 described above is washed with water, the flowing rate of the water flowing on the exposed surface 32a of the polar plate 32 on the exposed side and acting on the magnetic fluid 35 is weakened, and therefore, a smaller portion of the magnetic fluid 35 retained by the magnetic force is removed by the water flow. As a result, the reduction of the amount of the magnetic fluid is inhibited, making it possible to maintain the waterproofness of the bearing for a long period.

Figure 14:
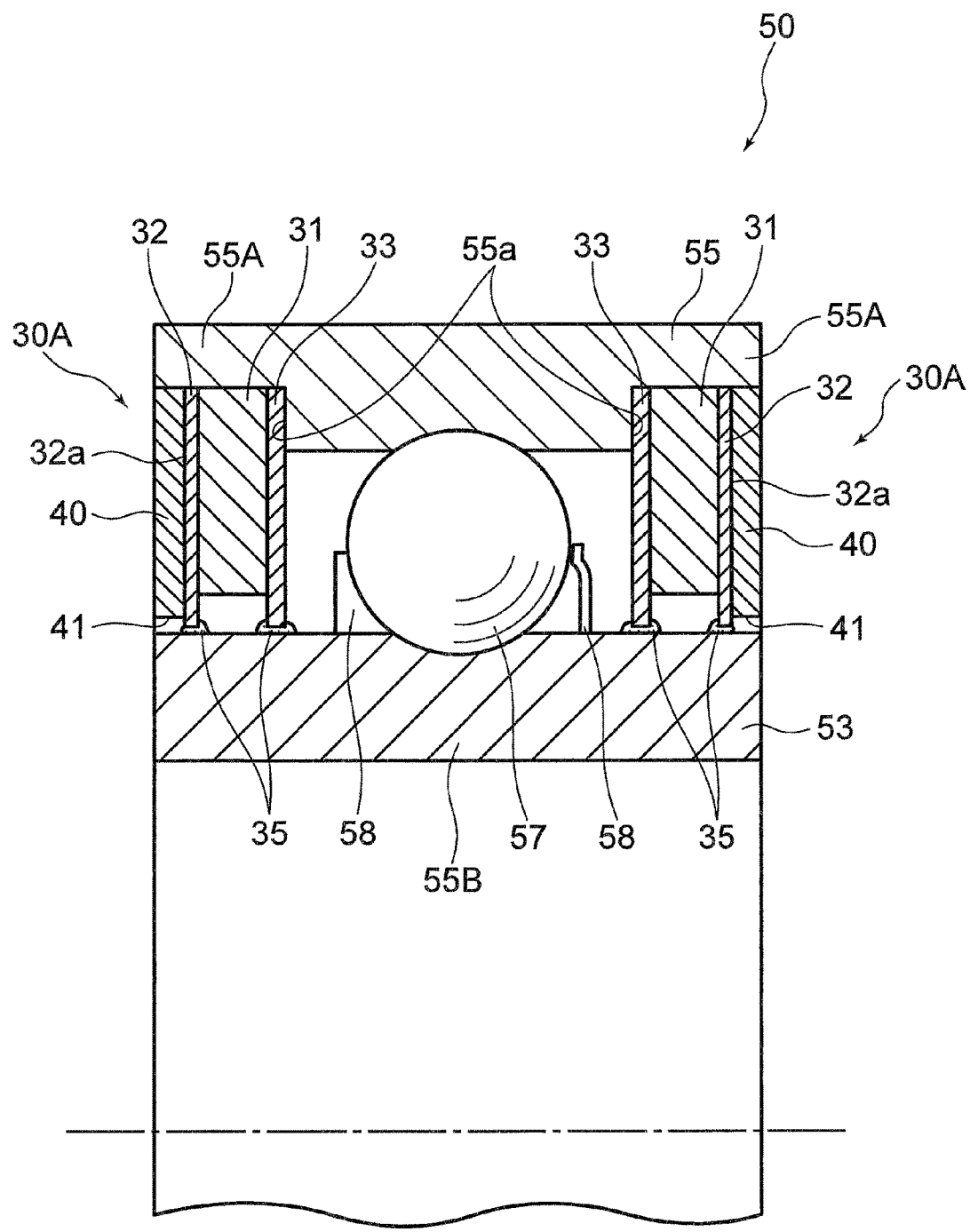
FIG. 14 shows a second embodiment of the magnetic fluid sealed bearing according to the disclosure.

The magnetic fluid seal 30A disposed in the opening portion between the inner ring and the outer ring of the baring is only specified to have the spill preventing portion on the exposed surface of the polar plate on the exposed side, and there is no particular limitation of other portions. For example, as shown in FIG. 14, the magnet 31 may be retained between two polar plates 32, 33, and the magnetic fluid 35 may be retained on the outer ring 55 side. The polar plate 32 on the exposed side, which is built in between the inner ring and the outer ring, may be positioned such that the spill preventing portion 40 is flush with the end surfaces of the inner ring and the outer ring, as shown in FIG. 14, or may be positioned such that the spill preventing portion 40 is recessed from the end surfaces of the inner ring and the outer ring, as shown in FIG. 13.

The bearing 50 described above can be disposed as necessary in a fishing reel on portions that support a rotational shaft. The spill preventing portion 40 may be built into the bearing along with the polar plate, as shown in FIGS. 13 and 14, or may be constituted by a part of peripheral components (such as a housing, a frame, or functional components).

Figure 15:
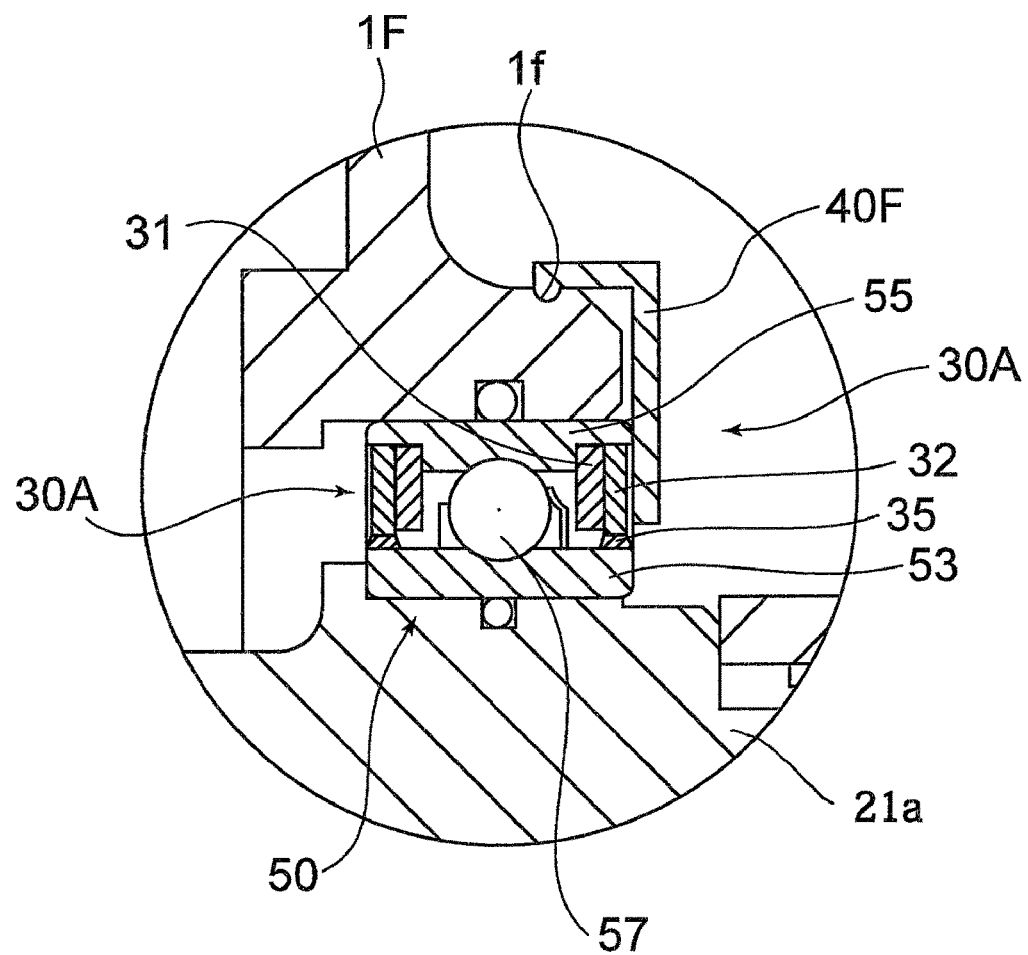
FIG. 15 shows a third embodiment of the magnetic fluid sealed bearing according to the disclosure.

For example, as shown in FIG. 15, when the bearing 50 described above is disposed between the main body 1F and the drive portion 21a for rotational drive so as to rotatably support the drive portion 21a, a cap-shaped retaining member 40F may be disposed on the opening side of the bearing 50. The retaining member 40F is press-fitted into an annular groove 1f formed in the main body 1F and simultaneously contacted with the end surface of the outer ring 55, so as to prevent the bearing 50 from coming off axially outward.

Such a retaining member 40F may also serve as the spill preventing portion of the bearing 50, as shown in FIGS. 13 and 14. Thus, it is not necessary to build the spill preventing portion into the bearing, and peripheral components around the bearing may serve to prevent the spill. With such a retaining member 40F, the bearing 50 can be maintained with simple operations such as cleaning, replacement, or oiling to the drive mechanism.

The magnetic fluid sealing device 30 and the magnetic fluid sealed bearing 50 as described above are only specified to have a spill preventing portion disposed on the polar plate on the exposed side such that the magnetic fluid is prevented from being removed by moisture. As described above, the spill preventing portion may be formed by the polar plate or formed of a separate member adhered or abutted. When the spill preventing portion is made of a non-magnetic material such as a resin such that the projecting wall is flush with the end surface of the polar plate, it is possible to mass-produce such integrated ring-shaped laminate in a simple manner, as shown in FIGS. 16 and 17.

Figure 16:
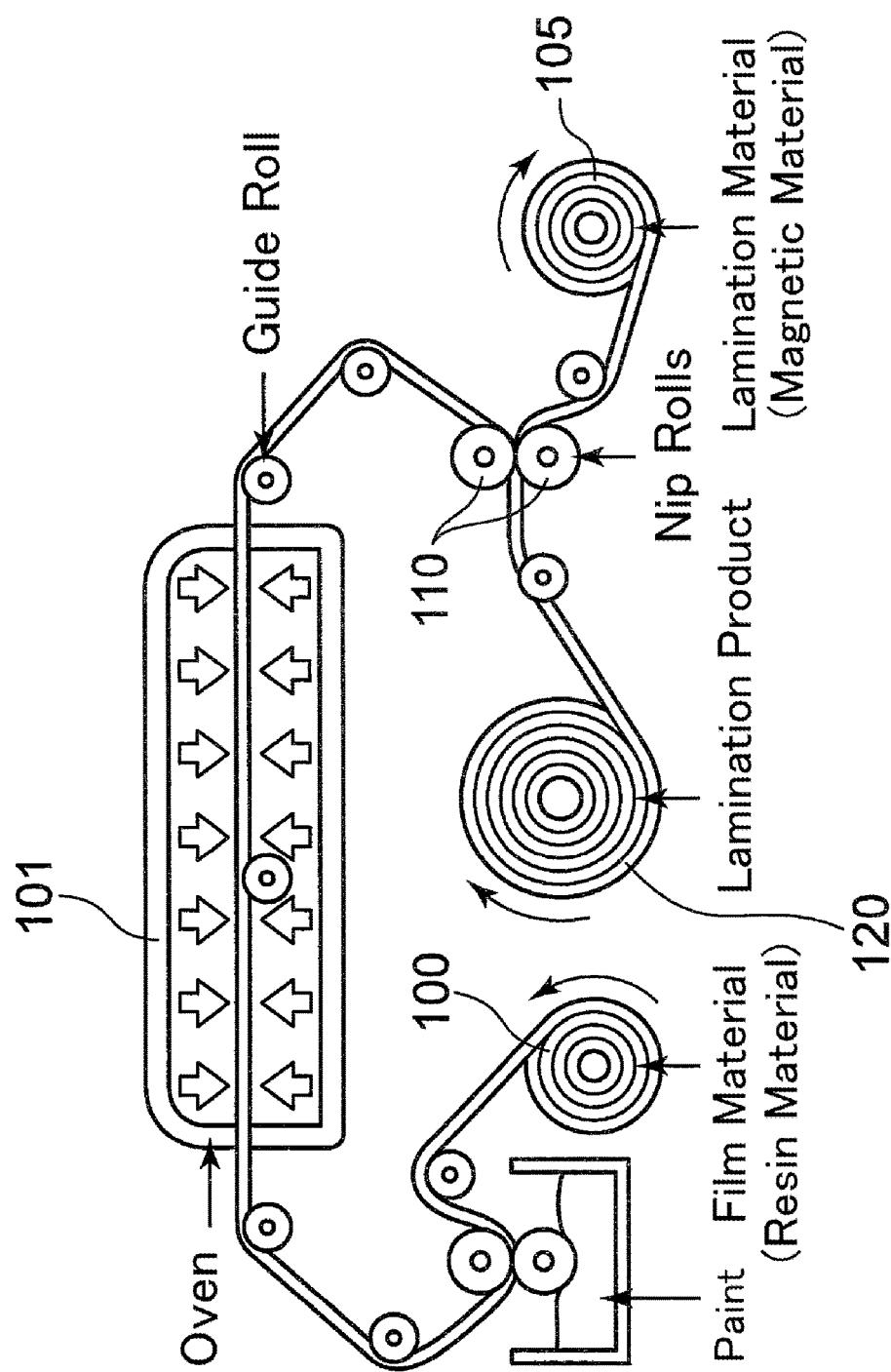
FIG. 16 is a schematic view showing an example of a method of producing the polar plate of the above embodiments, the polar plate having a lamination structure including a non-magnetic spill preventing portion (a method of producing a sheet member having a lamination structure).

FIG. 16 is a schematic view showing an example of a method of producing a lamination structure including a tabular ring-shaped magnetic material and a non-magnetic resin material attached to the exposed surface of the magnetic material, that is, a magnetic material having a resin film attached thereto. In this production method, a rolled resin material (film material) 100 is first drawn out by conveying rollers, an adhesive paint is applied onto one side of the resin material during conveyance, and then the resin material is conveyed into an oven 101 to semi-cure the paint. The resin material (film material) 100 having the semi-cured paint applied thereto is conveyed by guide rollers and is stacked by nip rollers 110 together with a magnetic material (lamination material) conveyed by conveying rollers from a roll in another line, thereby to produce a sheet-shaped lamination structure (lamination product 120) including the resin material and the magnetic material stacked together.

Figure 17:
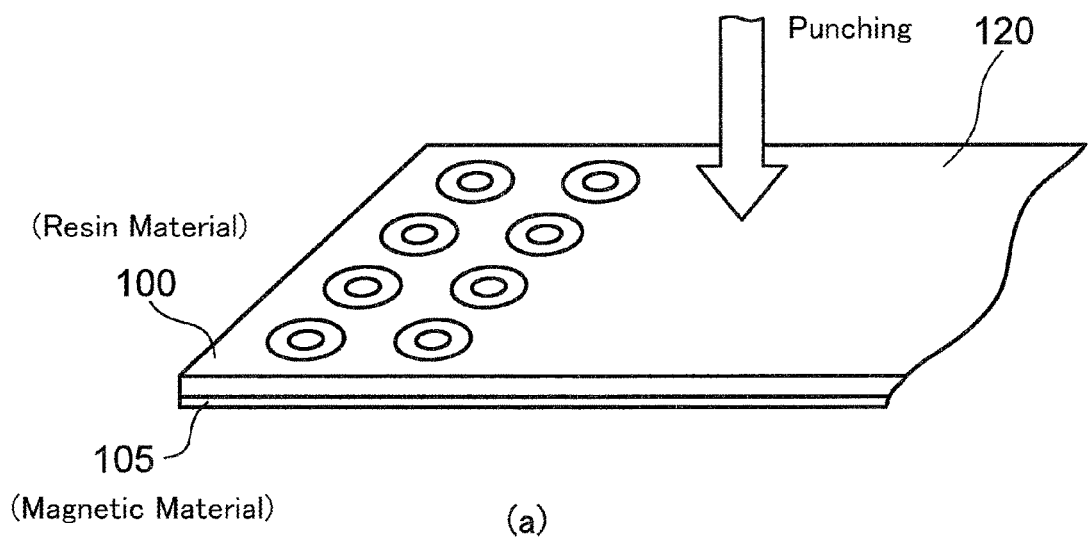
FIG. 17 illustrates a method of producing a ring-shaped polar plate from a laminated sheet member produced by the method shown in FIG. 16.
Figure 17:
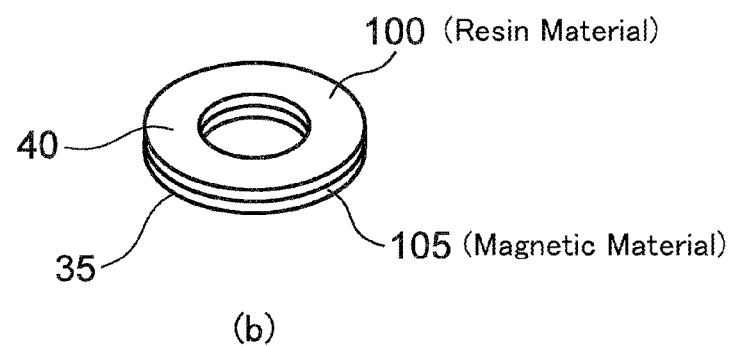

The lamination product 120 (the lamination structure including the resin material and the magnetic material) produced by the steps described above is punched (pressed) with a ring-shaped cutter, as shown in Part (a) of FIG. 17, thereby to mass-produce the ring-shaped washers as shown in Part (b) of FIG. 17 in a simple manner, the washers including the magnetic material 105 (the polar plate) and the resin material 100 (the spill preventing portion) stacked on the surface of the magnetic material 105. Thus, the polar plate 32 used in the embodiments described above has previously attached thereto the non-magnetic material (the spill preventing portion 40) having a thickness t, and therefore, the polar plate can be readily built in as a constituent of a magnetic fluid sealing device (a magnetic fluid sealed bearing).

The present invention described above is only specified to include a spill preventing portion having a projecting wall on the exposed surface of the polar plate on the exposed side so as to slow down the water flow, and modifications are possible in the arrangement of the magnetic fluid sealing device to the drive portion, or the mode the magnetic fluid sealing device is built in to the inner ring and the outer ring of the bearing.

The embodiments of the present invention described above have the following features. The spill preventing portion described above may be made of a ring-shaped member separate from the polar plate that is fixed on the exposed surface of the polar plate. The spill preventing portion described above may be tightly fixed to peripheral components around the portion where the magnetic fluid sealing device or the magnetic fluid sealed bearing is disposed, by means of adhesion, screwing, or retention between fixed components. The spill preventing portion described above may be constituted by a resin film attached to the exposed surface of the polar plate such that the projecting wall thereof is flush with the end surface of the polar plate.

What is claimed is:

1. A magnetic fluid sealing device, comprising:
    a ring-shaped polar plate encircling a drive portion and retaining a magnet; and
    a magnetic fluid retained in a gap between the drive portion and the polar plate by a magnetic force of the magnet, wherein
    the polar plate has a spill preventing portion provided thereon,
    the spill preventing portion having a projecting wall that is flush with the end surface of the polar plate or disposed distant from an end surface of the polar plate retaining the magnetic fluid to prevent spill of the magnetic fluid,
    the spill preventing portion is made of a magnetic material or a nonmagnetic material,
    the projecting wall is disposed distant radially outward from the end surface of the polar plate to form a step on an exposed surface of the polar plate, and
    the step satisfies a formula $t/\Delta r \geq 1/4$, where t is a thickness of the projecting wall, and $\Delta r$ is a radial distance from the end surface of the polar plate to the projecting wall.

2. The magnetic fluid sealing device of claim 1, wherein the spill preventing portion is made of a non-magnetic material, and the projecting wall is disposed distant from the end surface of the polar plate so as to be radially inside the end surface of the polar plate.

3. A method of producing a polar plate having a resin film attached thereto,
    wherein the spill preventing portion of claim 1 is made of the resin film attached to an exposed surface of the polar plate such that the projecting wall is flush with the end surface of the polar plate, and
    wherein the method of producing the polar plate having the resin film attached thereto comprises the steps of:
    forming a stacked sheet having lamination structure including a sheet-shaped magnetic member and a sheet-shaped resin sheet stacked on and adhered to a surface of the magnetic member; and
    punching the stacked sheet to produce a plurality of ring-shaped polar plates having a resin film attached thereto.

4. A magnetic fluid sealed bearing, comprising:
    an inner ring and an outer ring, both formed of a magnetic material;
    a plurality of rolling elements interposed between the inner ring and the outer ring;
    a ring-shaped polar plate disposed on an opening side between the inner ring and the outer ring, the polar plate having a magnet mounted thereto; and a magnetic fluid retained in a gap between the polar plate and the inner ring or in a gap between the polar plate and the outer ring to seal the plurality of rolling elements, wherein the polar plate has a non-magnetic spill preventing portion provided thereon, the spill preventing portion having a projecting wall that is disposed distant from an end surface of the polar plate retaining the magnetic fluid to prevent spill of the magnetic fluid, the projecting wall is disposed distant radially outward from the end surface of the polar plate to form a step on an exposed surface of the polar plate, and the step satisfies a formula $t/\Delta r \geq 1/4$, where t is a thickness of the projecting wall, and $\Delta r$ is a radial distance from the end surface of the polar plate to the projecting wall.

* * * * *